United States Patent [19]

Taylor et al.

[11] Patent Number: 4,691,510

[45] Date of Patent: Sep. 8, 1987

[54] FUEL SUPPLY SYSTEMS

[75] Inventors: Peter J. Taylor, Fareham; Alan Clarke, Gosport; John S. Thompson, Fareham, all of England

[73] Assignee: Plessey Overseas Ltd., Ilford, England

[21] Appl. No.: 723,872

[22] Filed: Apr. 16, 1985

[30] Foreign Application Priority Data

Apr. 17, 1984 [GB] United Kingdom ............... 8409999

[51] Int. Cl.[4] ............................................. F02C 7/236
[52] U.S. Cl. .................................... 60/39.094; 60/734
[58] Field of Search ........................... 60/39.094, 734; 415/168; 55/55, 189, 190

[56] References Cited

U.S. PATENT DOCUMENTS 2,757,582 8/1956 Freeman et al. ......................... 55/55
2,849,930 9/1958 Freeman et al. ......................... 55/55
4,066,386 1/1978 Johnson et al. ................... 60/39.094

FOREIGN PATENT DOCUMENTS

| 508342 | 6/1939 | United Kingdom . |
| 775161 | 5/1957 | United Kingdom . |
| 796886 | 6/1958 | United Kingdom . |
| 1260833 | 1/1972 | United Kingdom . |
| 1323845 | 7/1973 | United Kingdom . |

Primary Examiner—Louis J. Casaregola
Attorney, Agent, or Firm—Fleit, Jacobson, Cohn & Price

[57] ABSTRACT

A fuel supply system for use in rotary wing aircraft is described. The system comprises a separating means 10 for: receiving an air, vapor and fuel mixture at relatively low pressure from a fuel tank; separating the air and the vapor from the mixture; and providing a fuel supply at a relatively high pressure, and a pump means 12 for returning the separated air and vapor to the tank.

1 Claim, 4 Drawing Figures

FUEL SUPPLY SYSTEMS

This invention relates to fuel supply systems and more specifically to fuel supply systems primarily for use in rotary wing aircraft.

In one known fuel supply system for rotary wing aircraft fuel is pumped from a fuel tank to one or more engines normally situated at a higher level than the fuel tank of the aircraft. In this system, due to the fact that the fuel is pumped to the engine(s) a fracture occurring in the pipeline connecting the fuel tank to the engine, may result in fuel being pumped into the aircraft thereby creating a serious fire risk.

An alternative known fuel supply system which avoids this fire risk uses a suction principle whereby fuel is drawn up from the fuel tank by a jet pump. However, due to the pressure drop in the pipeline as the fuel rises from the tank to the jet pump, air and vapour separates out from the fuel which leads to a reduction in fuel input to the engine(s). This is particularly dangerous since a reduced or intermittent fuel input can lead to engine instability.

The present invention is directed to a fuel supply system which avoids the serious fire risk referred to above whilst at least alleviating the problem of air and vapour being fed to the engine.

According to the present invention there is provided a fuel supply system for use in aircraft, wherein the system comprises means for separating air and vapour from a fuel mixture at relatively low pressure derived by suction from a fuel tank of the aircraft and for providing a relatively high pressure fuel supply to the aircraft engine(s) and pump means for returning the separated air and vapour to the fuel tank.

The means for providing the high pressure fuel supply may include a fuel pump (e.g. gear pump) preferably connected to a fuel control system, the fuel pump being operative to pump fuel either directly from the separating means to the fuel control system or indirectly from the separating means through a jet pump, and the fuel control system being operative to control the supply of fuel to an engine.

Excess fuel or spill from the fuel control system is preferably fed back to the separating means or the jet pump for the motivation thereof.

The separating means may comprise a gravitational separator chamber for separating the air and the vapour from the fuel mixture, with a jet pump being provided on the outlet side of the separating means to deliver fuel at said relatively high pressure. In this case, the excess fuel from the fuel control system may be arranged to power the jet pump.

Alternatively, the separating means may comprise a vortex separator chamber which separates the air and the vapour from the fuel mixture and provides the fuel supply at said relatively high pressure. In this case, the excess fuel from the fuel control system may be arranged to power the vortex separator chamber.

Still further, the separating means may comprise means for condensing the vapour in the mixture to provide an air/fuel mixture, and a vortex separator chamber for separating the air from the mixture. In this case, the means for condensing the vapour may be a jet pump which is powered by the excess fuel from the fuel control system.

The invention will now be described by way of example with reference to the accompanying drawings, in which like references designate like elements, and in which.

Figure 1:
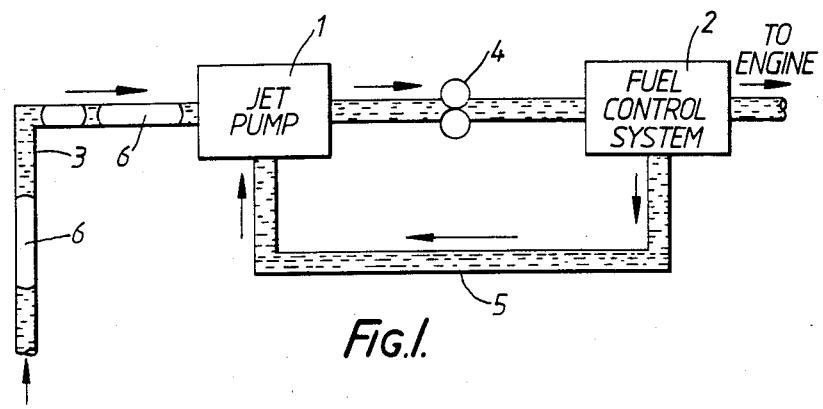
FIG. 1 is a diagram of a prior art fuel supply system.

In FIG. 1, there is shown a diagram of a prior art fuel supply system for a rotary wing aircraft, which system comprises a jet pump 1 and a fuel control system 2.

Unpressurised fuel is drawn up from a tank (not shown) via a pipeline 3 by means of the jet pump 1. The jet pump 1 provides a pressurised input of fuel to a fuel pump 4 which may be in the form of a gear pump. The fuel pump 4 pumps the fuel from the jet pump 1 to the fuel control system 2 which determines the amount of fuel to be fed to the engine (not shown) in response to the demands of the engine.

Excess fuel supplied to the fuel control system 2 is fed along a pipeline 5 and is used to drive the jet pump 1. This excess fuel fed to the jet pump 1 is the motive flow of the jet pump 1.

In a helicopter, the fuel supply system is usually situated above the fuel tank and so the pressure of the fuel drops as it rises from the tank to the fuel supply system. The pressure drop causes air to separate out of the fuel and some of the fuel vaporises. The air and vapour form into bubbles 6 which pass up the pipeline 3 with the fuel.

As a consequence of the bubbles 6 being mixed with the fuel, the flow of fuel into the jet pump 1 becomes intermittent (known as slug flow) and hence the total flow of fuel into the fuel control system 2 falls. This fall in the net input of fuel to the engine can in turn lead to engine instability due to pressure fluctuations in the high pressure delivery of the fuel pump 4. Further, the jet pump 1 pulls air out of solution in the fuel and causes air bubbles to enter the fuel pump 4.

Figure 2:
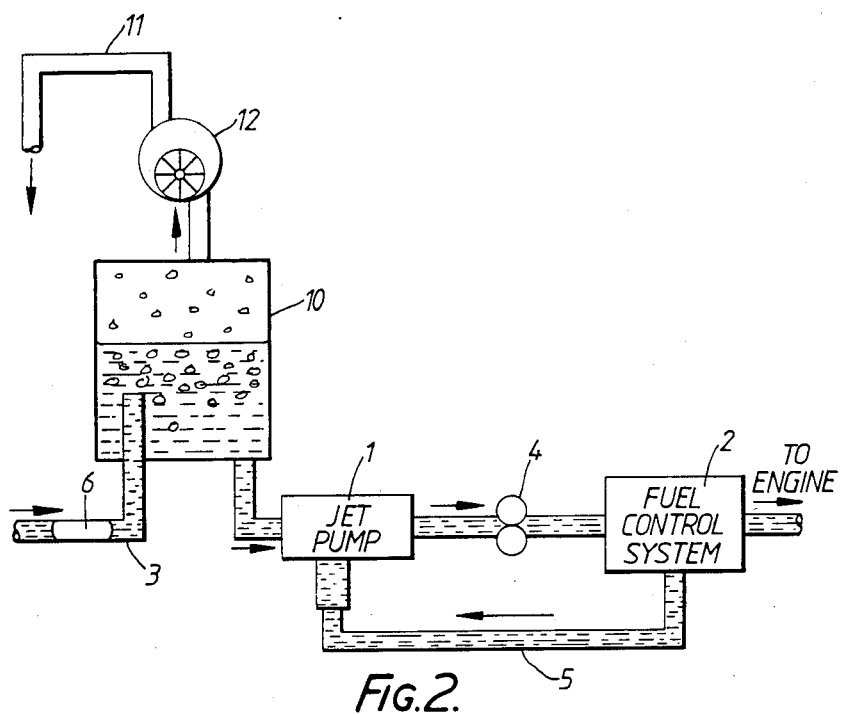
FIG. 2 is a diagram of a fuel supply system embodying the present invention.

Referring now to FIG. 2, there is shown a diagram of one fuel supply system which embodies the present invention. In this system, there is included a gravitational separator chamber 10 which separates air and vapour from the fuel mixture which passes up the pipeline 3. The mixture passes into the separator chamber 10 and fuel gravitates to the bottom of the chamber. Air and vapour rises to the top of the chamber 10 and is pumped back to the fuel tank (not shown) via a pipeline 11 by means of a pump means 12 which may be in the form of a ring pump.

The fuel which has gravitated to the bottom of the separator chamber 10 is drawn into the jet pump 1 which is operated by means of the motive flow of spill fuel through the pipeline 5. Fuel from jet pump 1 is pumped by means of the pump means 4 into the fuel control system 2 as described above with reference to FIG. 1.

Since air and vapour is allowed to rise out of the fuel gravitating to the bottom of the separator chamber 10, the fuel entering the jet pump 1 from the bottom of the separator chamber 10 is substantially free from air and vapour bubbles. Consequently, fluctuations in the pressure of fuel supplied to the fuel control system 2 and the engine are avoided.

Figure 3:
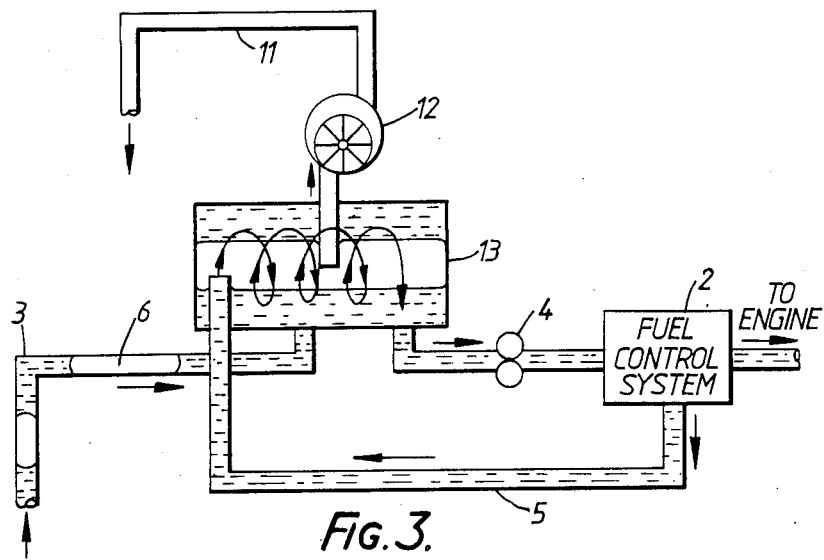
FIG. 3 is a diagram of a second embodiment of the present invention.

Referring to FIG. 3, a second embodiment of the present invention is shown. In this embodiment a vortex separator chamber 13 is used to separate the air and the vapour from the mixture which passes up the pipeline 3.

The excess fuel which passes along the pipeline 5 from the fuel control system 2 is fed into the vortex separator chamber 13 so that the fuel mixture within the chamber is caused to swirl around the periphery of the chamber walls as indicated by arrows. Due to centrifugal forces, the pressure of the mixture is lower towards the centre of the chamber than along the wall. Consequently, air and vapour bubbles are encouraged to collect at the centre of the chamber 13 where they can be extracted by means of the pump means 12 and returned to the fuel tank (not shown) via the pipeline 11.

The fuel which is derived from the peripheral region of the chamber 13 is pumped to the fuel control system 2 via the gear pump 4. Since this fuel is derived from a relatively high pressure region in the vortex chamber 13, it is substantially de-aerated as well as being at a relatively high pressure compared with the pressure of the fuel supplied to the chamber from the fuel tank.

Figure 4:
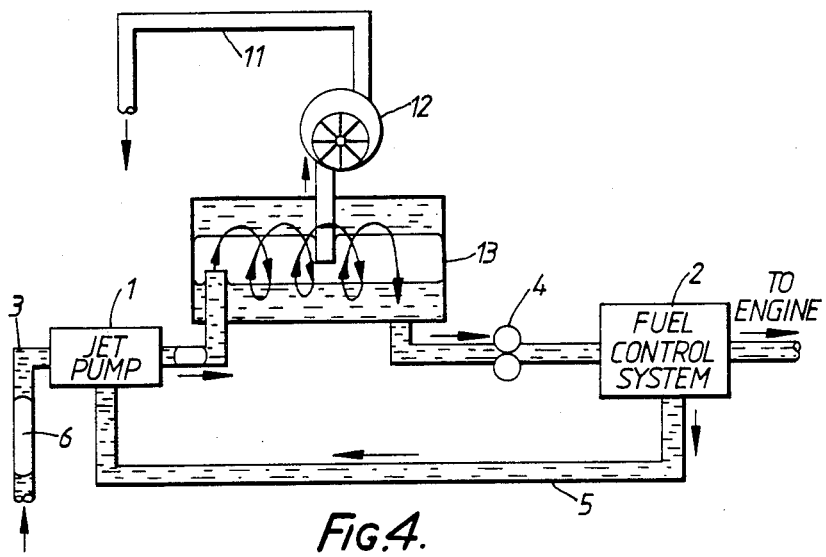
FIG. 4 is a diagram of a third embodiment of the present invention.

FIG. 4 is a diagram of a third embodiment of the present invention in which the jet pump 1 is situated before the vortex separator chamber 13. The jet pump 1 is powered by the motive flow of spill fuel from the fuel control system 2 and this draws the fuel mixture from the tank (not shown) via the pipeline 3 into the separator chamber 13. The operation of the jet pump 1 causes fuel vapour to return to its liquid phase (i.e. to condense) and so the mixture leaving the jet pump contains substantially only fuel and air. The air is separated from the air/fuel mixture in the vortex separator chamber 13 in the manner described with reference to FIG. 3, except in this case, the chamber 13 is powered by the relatively high pressure air/fuel output of the jet pump 1.

Since the air/fuel mixture leaving the jet pump 1 is at a higher pressure than the incoming fuel mixture from the tank, the Net Positive Suction Head (NPSH) available for the gear pump 4 and the pump means 12 is increased, and hence the fuel is prevented from boiling at these positions.

Consequently, a fuel supply system constructed in accordance with this embodiment can supply fuel to an engine at higher altitudes where the fuel is at its boiling point.

Since the embodiments of the invention described above operate on a suction principle, a refuelling input line can be joined to the pipeline 3, or to the pipeline 11 and fuel pumped to the fuel tank by the pump 12.

What is claimed:

1. A fuel supply system for use in rotary wing aircraft, said system comprising:

vortex separator means including a chamber having a liquid fuel portion and an air and fuel vapor portion, said chamber having an inlet for passage of fuel mixture from a fuel supply tank of the rotary wing aircraft into the vortex separator means, and having an outlet for conveying a liquid fuel supply from the vortex separator means;

first pump means having an input port and an output port, the input port extending into the air and fuel vapor portion of the vortex separator means, the first pump means being operative for producing a relatively low pressure region within the air and fuel vapor portion of the vortex separator means for drawing air and fuel vapor therefrom;

discharge output means connected to the output port of the first pump means for conveying air and fuel vapor to the fuel supply tank, said first pump means being operative for producing a relatively high pressure within the discharge output means to provide a pressure differential between said input port and said output port so that air and fuel vapor from the fuel mixture can be discharged from the vortex separator means;

feed means coupled to the vortex separator means for inducing a fuel mixture to swirl within the vortex separator means so as to produce a relatively high pressure region therein so that air and vapor of the fuel mixture can migrate to a relatively low pressure region and liquid fuel of the fuel mixture can migrate to a relatively high pressure region, the outlet of said vortex separator means being situated in the relatively high pressure region so that liquid fuel at the outlet is at the relatively high pressure;

said feed means including a second pump means, fuel control means for controlling the fuel supply to an engine of the rotary wing aircraft, a jet pump, and a fuel line, said second pump means being connected between the outlet of the vortex separator means and the fuel control means and being operative for pumping liquid fuel at relatively high pressure from the vortex separator means to the fuel control means at a relatively higher pressure, the jet pump communicates with the inlet to the vortex separator means and a source of a fuel mixture for feeding the fuel mixture into the inlet of the vortex separator means, and the fuel line extends between the fuel control means and the jet pump for carrying excess fuel from the fuel control means to the jet pump, which excess fuel drives the jet pump by virtue of its relatively higher pressure so that the fuel mixture fed to the vortex separator means is induced to swirl therein.

* * * * *